(12) United States Patent
Fisher

(10) Patent No.: US 7,211,165 B2
(45) Date of Patent: May 1, 2007

(54) METHOD OF FORMING MULTIWELL FILTRATION PLATES

(75) Inventor: Bryan Fisher, Beverly, MA (US)

(73) Assignee: Millipore Corporation, Billerica, MA (US)

( * ) Notice: Subject to any disclaimer, the term of this patent is extended or adjusted under 35 U.S.C. 154(b) by 537 days.

(21) Appl. No.: 10/756,030

(22) Filed: Jan. 13, 2004

(65) Prior Publication Data

US 2004/0144484 A1    Jul. 29, 2004

(51) Int. Cl.
  *B32B 37/00*    (2006.01)
  *B29C 65/00*    (2006.01)
  *B01D 71/00*    (2006.01)
(52) U.S. Cl. .............. 156/272.2; 156/272.6; 156/272.8; 156/273.5; 156/290; 422/101; 422/102; 422/104; 210/474; 210/477; 435/285.6
(58) Field of Classification Search ............ None
See application file for complete search history.

(56) References Cited

U.S. PATENT DOCUMENTS

| | | |
|---|---|---|
| 2001/0042710 A1 | 11/2001 | Lautenschlager et al. |
| 2002/0022219 A1 | 2/2002 | Gagnon et al. |

FOREIGN PATENT DOCUMENTS

| | | |
|---|---|---|
| WO | WO 00/20117 | 4/2000 |
| WO | WO 01/19502 | 3/2001 |
| WO | WO 01/19505 | 3/2001 |
| WO | WO 02/40158 | 5/2002 |
| WO | WO 03/008100 | 1/2003 |

*Primary Examiner*—Justin R. Fischer

(57) ABSTRACT

A method of forming a multiwell filtration plate comprising of first gluing a filter to a major surface of a multiwell plate so as to close off one entrance to the wells of the plate. The filter is then heat sealed so as to collapse the pores of the filter in the area between the wells so as to prevent lateral migration of fluid from one well to another.

13 Claims, 4 Drawing Sheets

US 7,211,165 B2

METHOD OF FORMING MULTIWELL FILTRATION PLATES

The present invention relates to a method of forming a multiwell filtration plate. More particularly, it relates to a method of forming a multiwell filtration plate using glue and heat to bond the filter to the plate.

BACKGROUND OF THE INVENTION

Multiwell plates have existed for many years. Most are in multiples of 6, 8 or 12 such as 24, 96 or 384 wells in a single plate.

Methods to attach the filter material to the bottom of the plate so as to seal off the bottom of each well by the porous filter material have included mechanical means such as friction fitting of individual pieces in each well or clips or edge bands to hold the filter material against the bottom; adhesives, heat bonding, over molding and thermal bonding via an under drain.

Each approach has its drawbacks. Simply stuffing a cut piece into each well is time consuming and provides less than 100% sealing accuracy. With the 384 well format, this approach is impractical. Likewise, using a clamp or edge band allows the filter material in the middle to separate from the bottom of the wells allowing for cross talk or contamination between wells.

Adhesives require proper placement and alignment of the adhesive and filter material so as to prevent adhesives from spreading into the area of filter inside the well that reduces its active filtration area. Moreover, adhesives do not extend through the entire thickness of the filter material allowing for cross talk and contamination between wells through the filter material beyond the glue.

Overmolding or insert molding eliminates cross talk and forms an integral well, but it is costly to set up and run and is a relatively slow process. Moreover, its use at smaller well sizes (384+) is limited by the ability to form channels and gates for the introduction of the molten plastic in that small area.

Using thermal energy to bond and seal the filter to the bottom of the plate is difficult. Achieving 100% sealing of the filter to the bottom by thermal bonding is not possible. Some filter materials do not bond properly to the material of the plate, limiting this approach to only compatible materials. Other filters are extremely heat sensitive making this approach untenable as the filter structure tends to collapse to such an extent that active filtration area is compromised.

Using thermal energy to trap the filter between an upper plate and lower plate is possible. Again, it is limited in speed and cost to set up and run. Moreover, it requires the use of a fixed design for a bottom plate that may either be unnecessary or improperly suited for the desired application.

What is desired is a process that is fast, inexpensive and reliable for making a multiwell filtration plate where each well is integrally sealed about its edge and no cross talk or contamination between wells is possible. The present invention provides such a process.

SUMMARY OF THE INVENTION

The present invention comprises a process for forming integral sealed wells in a multiwell plate by first gluing a filter material to the bottom of a multiwell plate containing a series of two or more wells open at the top and bottom of the plate and after gluing the filter in place sealing and bonding the filter material by a heat sealing process along the bottom surface of the plate so as to collapse the porous structure of the filter in the areas outside of the wells. Optionally, a director plate may then be glued to the filter side of the plate along the collapsed regions. The process provides a multiwelled device having a filter attached to its bottom surface wherein each well is integral and fully sealed so that no cross talk or contamination occurs between adjacent wells.

IN THE DRAWINGS

DETAILED DESCRIPTION

The present invention is a process for forming a multiwell plate having a filter attached to its bottom surface in a manner that provides an integral seal around the outer periphery of each well.

Figure 1:
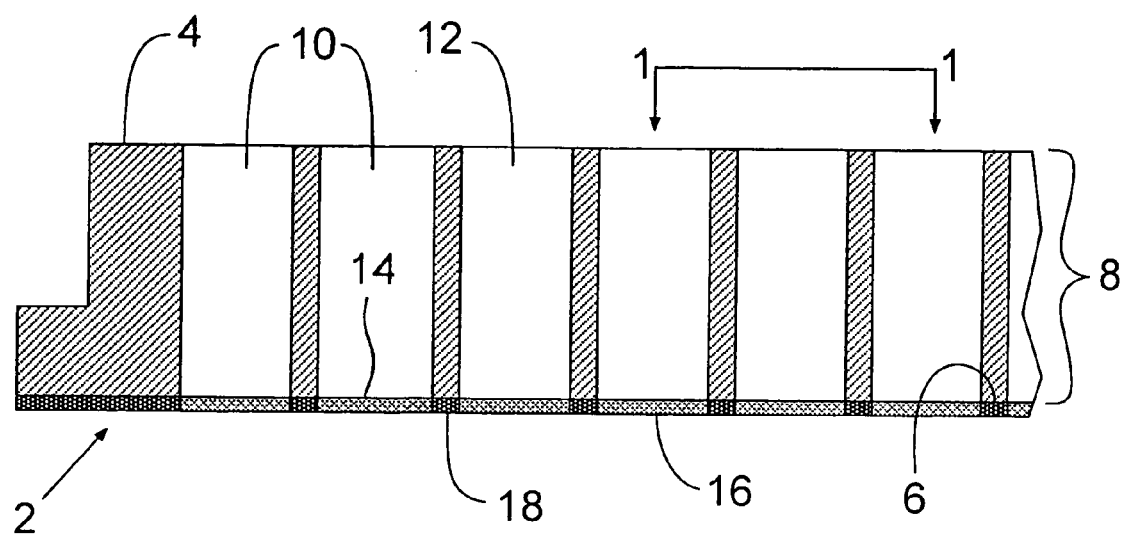
FIG. 1 shows a first embodiment of the invention in cross-sectional view.

FIG. 1 shows a partial cross sectional view of a first embodiment of the present invention. As shown, plate 2 has a top surface 4, a bottom surface 6 and a thickness 8 between. A series of wells 10 are formed through the thickness 8 of the plate 2. Each well 10 has an upper opening 12 corresponding with the upper surface 4 of the plate and a lower opening 14 corresponding with the lower surface 6 of the plate and the well 10 forming a through hole through the thickness 8 of the plate 2 from the top opening 12 to the bottom opening 14.

A filter sheet 16 is attached to the bottom surface 6 of the plate 2 such that it covers all of the bottom openings 14 of the wells 10 and the surrounding bottom surface 6 of the plate. The area of the filter 16, which is in contact with the bottom surface 6, has been sealed and adhered to the bottom surface 6 by a sealed area 18.

Figure 2:
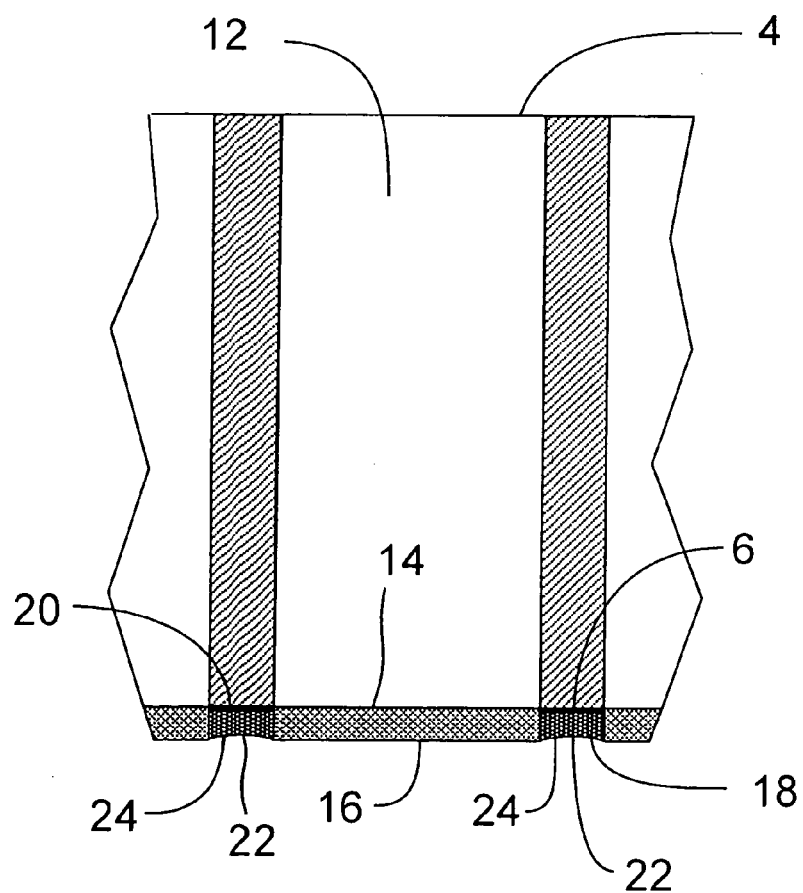
FIG. 2 shows a close up cross-sectional view of the embodiment of FIG. 1 taken along lines 1—1.

FIG. 2 shows a close up cross sectional view of the embodiment of FIG. 1. The plate 2 again has a top surface 4, a bottom surface 6, a thickness 8, series of wells 10 and the membrane 16 attached to the bottom surface 6 as described in relationship to FIG. 1. As shown in FIG. 2, the sealing area 18 is formed of two aspects; a glue attachment 20 between the bottom surface 6 of the plate 2 and at least a portion of the thickness of the filter 16 and a heat seal 22 formed between the outer surface 24 of the filter 16 and the glue attachment 20.

The heat seal, at the very least, creates a liquid impermeable barrier around each of the wells. Preferably, it causes the porous structure of the filter outside of the wells to substantially collapse reducing the porosity in those areas to substantially nothing. This coupled with the glue attachment effectively forms an impermeable dam around the outer periphery of each well so that the liquid in a well does not move laterally to an adjacent well, thus eliminating cross talk and the potential for contamination.

The method for forming a plate of FIG. 1 is as follows: One takes a plate having a top surface, a bottom surface and defined thickness between the two surfaces. The plate has a series of wells running through the thickness of the plate and having a top and bottom opening corresponding with the top and bottom surface of the plate.

An adhesive is applied to the bottom surface of the plate (e.g. to the solid portions of the plate bottom) and the filter is then placed on top of the adhesive and compressed to make intimate contact with the adhesive. Preferably, the adhesive penetrates a portion of the thickness of the filter material to establish a good bond between the plate bottom and the filter. Alternatively, one could apply the glue via a robotic X/Y applicator to the filter and then attach the filter to the plate. However in this embodiment, one must carefully align the filter with the plate to ensure good sealing. The use of alignment pins, pins/holes, notches, marks and the like are useful if one decides to use this alternative embodiment.

After curing, the filter is then subjected to a heat sealing step. The area of the filter that is directly over a solid portion of the plate bottom is heat sealed. The area of the membrane that is over the open wells in the plate bottom remain substantially free of either the adhesive or the heat bonding so as to retain the maximum area of filtration for each well.

If desired, an under drain containing collector wells or directing spouts that are in register with the wells of the plate may then be attached to the bottom of the plate using an adhesive, heat weld, vibration weld and the like.

The plate may be any plate commonly used in multi well filtration. It should contain a series of two or more wells. Preferably, it contains a series of wells that are at least 12, preferably 24, more preferably at least 96, or at least 384 and even up to 1,536 wells per plate. The plate should be relatively rigid or self-supporting to allow for easy handling during manufacturing and easy handling during use by the end user (a human or a robot). Additionally, its dimensions should conform to those set out by the Society for Biological Standards so that it can be used in all robotic applications. Preferably the plate may be made of polymeric, especially thermoplastic materials, glass, metallic materials, ceramic materials, elastomeric materials, coated cellulosic materials and combinations thereof such as epoxy impregnated glass mats. In a more preferable embodiment, the plate is formed of a polymeric material including but not limited to polyethylene, acrylic, polycarbonate and styrene. The wells can be made by injection molding, drilling, punching and any other method well known for forming holes in the material of selection. Such plates are well known and commercially available from a variety of sources in a variety of well numbers and designs. Most common are 96 and 384 well plates.

The well format will be determined by the end users needs, but it can have numerous configurations and the wells do not necessarily need to be all of the same shape or size. For example, the wells of the present invention may have round, rectangular, teardrop, square, polygonal and other cross-sectional shapes or combinations of them. Virtually any shape that is required for the product may be provided. Typically, it has the wells arranged in uniformly spaced rows and columns for ease of use.

Ultrafiltration (UF) filters, which may be used in this process, can be formed from the group including but not limited to polysulphones, including polysulphone, polyethersulphone, polyphenylsulphones and polyarylsulphones, polyvinylidene fluoride, and cellulose and its derivatives, such as nitrocellulose and regenerated cellulose. These filters typically include a support layer that is generally formed of a highly porous structure. Typical materials for these support layers include various non-woven materials such as spun bounded polyethylene or polypropylene, paper or glass or microporous materials formed of the same or different polymer as the filter itself. Alternatively, the support may be an openly porous, asymmetric integral portion of the ultrafiltration filter that may either be formed with or without macrovoids. Such filters are well known in the art, and are commercially available from a variety of sources such as Millipore Corporation of Bedford, Mass.

Preferred UF filters include regenerated cellulose or polysulphone filters such as YM™ or Biomax® filters available from Millipore Corporation of Bedford, Mass.

Representative suitable microporous filters include nitrocellulose, cellulose acetate, regenerated cellulose, polysulphones including polyethersulphone and polyarylsulphones, polyvinylidene fluoride, polyolefins such as ultrahigh molecular weight polyethylene, low density polyethylene and polypropylene, nylon and other polyamides, PTFE, thermoplastic fluorinated polymers such as poly (TFE-co-PFAVE), polycarbonates or particle filled filters such as EMPORE® filters available from 3M of Minneapolis, Minn. Such filters are well known in the art and available from a variety of sources, such as DURAPORE® filters and EXPRESS® filters available from Millipore Corporation of Bedford, Mass.

The filter material may also be formed of glass fibers or mats, woven plastics and non-woven plastics such as TYPAR® non-wovens available from DuPont de Nemours of Wilmington. Del.

The filter may be in the form of an isotropic, track etched material (such as ISOPORE™ membranes), a cast membrane, preferably a microporous or ultrafiltration membrane such as DURAPORE® membranes, EXPRESS® membranes or EXPRESS® PLUS membranes available from Millipore Corporation of Bedford, Mass., non-woven filter materials such as spun bonded polypropylene, polyethylene or polyester (Typar® or Tyvek® paper), PTFE resin membranes and the like.

A variety of adhesive bonding processes are envisioned and include light curing, air curing, hot melt adhesion, solvent adhesion and other such methods as are well known to one of ordinary skill in the art. Those of ordinary skill in the art would appreciate other means of adhering two layers together.

The adhesive can be any one that is capable of bonding the filter to the plate bottom. Suitable adhesives include but are not limited to solvent based adhesives, crosslinking adhesives, such as room temperature vulcanizable silicones, epoxies, including light curable epoxies such as UV light curable epoxies, hot melt adhesives and the like.

Preferably, a rapid curing adhesive such as a light curing, cyanoacrylate or thermally activated adhesives are preferred because the product can move continuously through a manufacturing process without the requirements of batch processing. The light curing adhesives are more preferred as the adhesive for attaching the filter to the plate. This is because this type of adhesive has been found to provide a liquid tight seal with a large variety of filters and plate materials and to do so in a continuous manufacturing process. The light curing adhesives such as 3201 and 3211 from Loctite Corporation works well. Other light curing adhesives are well known and readily available from companies such as Dymax of Torrington Conn., Masterbond of Hackensack, N.J., Permabond of Engelwood, N.J. and others.

While light cured adhesives are preferred due to their ease of use, other adhesive systems such as two part epoxies and solvent based adhesive systems can be used successfully in the invention especially when the materials are found to be compatible.

When using adhesives it is required that the adhesive be suitable for bonding to both the plastic part and to the filter and not have any adverse effect on the assay or filter performance.

It is preferred to use adhesives with relatively high viscosity (typically greater than 5000 cps, preferably greater than 7500 cps and more preferably about 10,000 cps), so that the adhesive does not migrate to areas of the filter that otherwise would be used in the filtration process. Any adhesive that migrates outside the seal area will reduce the effective filter area. One high viscosity adhesive is the Loctite 3211 and it has been found suitable for use in this invention.

Alternatively, one may use lower viscosity adhesives in combination with the use of masks to prevent the flow of adhesives to the area of effective filter. One may also form a series of troughs in the bottom of the plate to hold the adhesive and have the filter placed on top of the troughs to contact the adhesive in the proper areas.

The method of forming the structure of the present invention is to use heat or a combination of heat and pressure to selectively collapse porous areas of the filter that lie over the solid portions of the bottom of the plate and to maintain the porous structure of the filter that lies over the wells of the plate. The selection of heat or heat and pressure is determined by the porous structure material and the desires of the designer. It is preferred with polymeric materials to use a combination of heat and pressure in forming the device.

In a typical method for making the present invention, one determines which process one will use and then forms a template in the desired shape and pattern for the desired product. For example, one simply measures the bottom of the plate on to which the filter is to be attached and forms a template for that dimension.

The template is then placed against the filter after it has been glued to the plate and a choice of heat or heat and pressure is applied to the filter for a period of time sufficient to form the collapse of the porous material in the areas where the filter lies over a solid portion of the plate. Typically, the template is a flat, solid surface although it doesn't need to be. Alternatively, the template may contain a pattern that corresponds to the solid surface of the plate to which the filter is sealed. For example in 384 well plates, the wells are typically square and a grid-like template where the grids of the template correspond to the solid portions of the plate can be used.

When using heat, one should select a temperature which is sufficient to cause the pores in the selected areas to collapse but not to cause the pores is the others areas to collapse. This allows the areas that are heated treated to be rendered substantially non-porous, preferably non-porous. The specific temperature is dependent upon the polymer used. However, the temperature should be from well before the structure begins to deform to the melting point of the structure. Alternatively, one can use a temperature from about 25° C. to about 500° C., preferably from about 25° C. to about 300° C. and more preferably from about 50° C. to about 200° C. for a time sufficient to cause collapse of the porous structure. The time can vary depending on the temperature used but can be in the range of about 1 second to 60 minutes, preferably between about 1 seconds and about 30 minutes and more preferably between about 2 seconds and about 10 minutes.

The use of a laser may alternatively be made in performing the heat bonding step. Any laser that provides the necessary level of heat may be used. One such device is a Synrad CO2 laser. The power at which it is used depends upon the materials involved, the laser selected and the desired depth of the laser penetration. For the Synrad CO2 laser, a power of about 10 watts is sufficient to provide the desired effect.

When using the combination of heat with pressure, one should use sufficient pressure to cause the collapse of the pores in the selected area without adversely affecting the pores in the other areas. The amount of pressure used can vary depending on the amount of surface area to be collapsed, time, temperature and the strength of the plate, but one can typically use from about 10 psi to about 1,000 psi.

The template can be made of a material normally used in heating applications. Metals such as stainless steel or aluminum are preferred as they easily conduct heat. Various plastics such PTFE, polyethylene, especially ultrahigh molecular weight polyethylene (UPE), polypropylene or epoxies can be used to make templates as well. Other materials such as fiberglass or carbon composites can be used to make templates. All that is required is that the material have sufficient strength and heat conductivity to withstand the use. The template may also have a non-stick surface such as a PTFE coating in order to ensure easy removal of the formed structure from the template.

The following example shows the formation and use of one embodiment of the present invention.

EXAMPLE 1

5 series of 10 Millipore Multiscreen® polystyrene plates were obtained. Each series was sealed with a HVPP filter available from Millipore Corporation of Bedford, Mass. to each series of plates in the following manner:
  (1) Glued only (3201 light curable adhesive from Loctite Corporation);
  (2) Glued, followed by a laser cut (using a Synrad CO2 laser) around the periphery of each well;
  (3) Heat sealed only, using two separate heat seal steps at 375° F. for 4 seconds at 70 psi with the plate being turned 180° between seals.
  (4) Same as (3) followed by a laser cutting (using a Synrad CO2 laser) around the periphery of each well; and
  (5) Glued as in (1) followed by the heat sealing process of (3).

The integrity of the wells on each plate in each of the series was tested by applying a vacuum at 20" mercury to the underside of the membrane.

15 microliters (15 μl) of liquid (MILLI-Q® water) was added to each well and a vacuum was applied to draw the liquid through the filter into a collection well positioned below it. A product was deemed to be suitable if 12 or more μl of liquid was collected in the collection plate.

For Series 1 and 2 liquid collection was below 12 μl and liquid was found to migrate laterally in the filter between wells and to collect in dead spots in the filter.

For Series 3 and 4, some wells collected 12 or more μl liquids, but lateral movement in the filter was still a problem.

For Series 5, which corresponds to the present invention, all wells were integral and passed at least 12 μl of liquid to the collection wells. In addition, no liquid was found to have moved laterally in the filter nor was any liquid found in the dead space of the filter (filter area between the wells).

EXAMPLE 2

Two 384 well plates, Multiscreen® polystyrene plates, available from Millipore Corporation of Bedford, Mass., were obtained. Each was sealed with a HVPP filter available from Millipore Corporation of Bedford, Mass. by a gluing procedure using 3201 light curable adhesive from Loctite Corporation. The glue was applied to the ribs of the bottom surface of the plates and then the membrane was applied over it. Hand pressure was applied to obtain a good seal and the glue was cured with UV light.

One plate A was then heat sealed by a laser cut (using a Synrad CO2 laser at an energy level of 10.4 watts) around the periphery of each well. The other plate B was left as is.

100 µl of a 0.1% (w/v) Ponceau S in 5% (w/v) acetic acid (Sigma Catalog # P7170) was added to one well of each plate. The liquid was allowed to stand at room temperature for fifteen minutes.

Figure 3A:
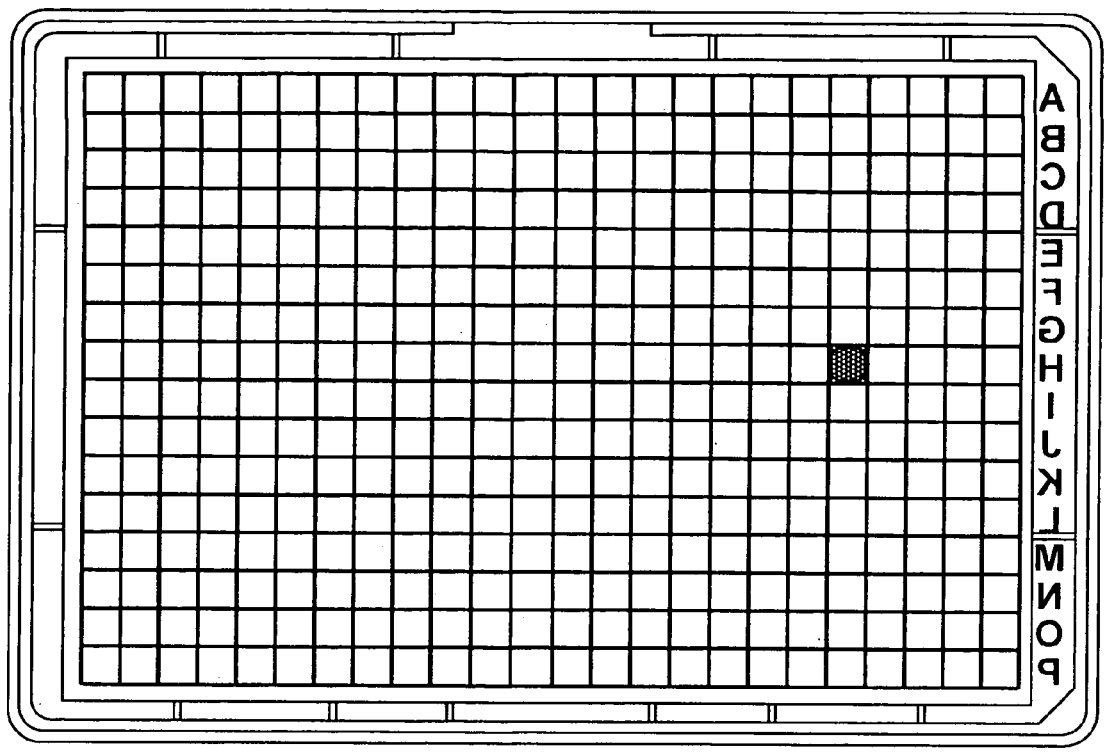
FIG. 3A shows a planar view of a bottom surface of the present invention as described in Example 2.
Figure 3B:
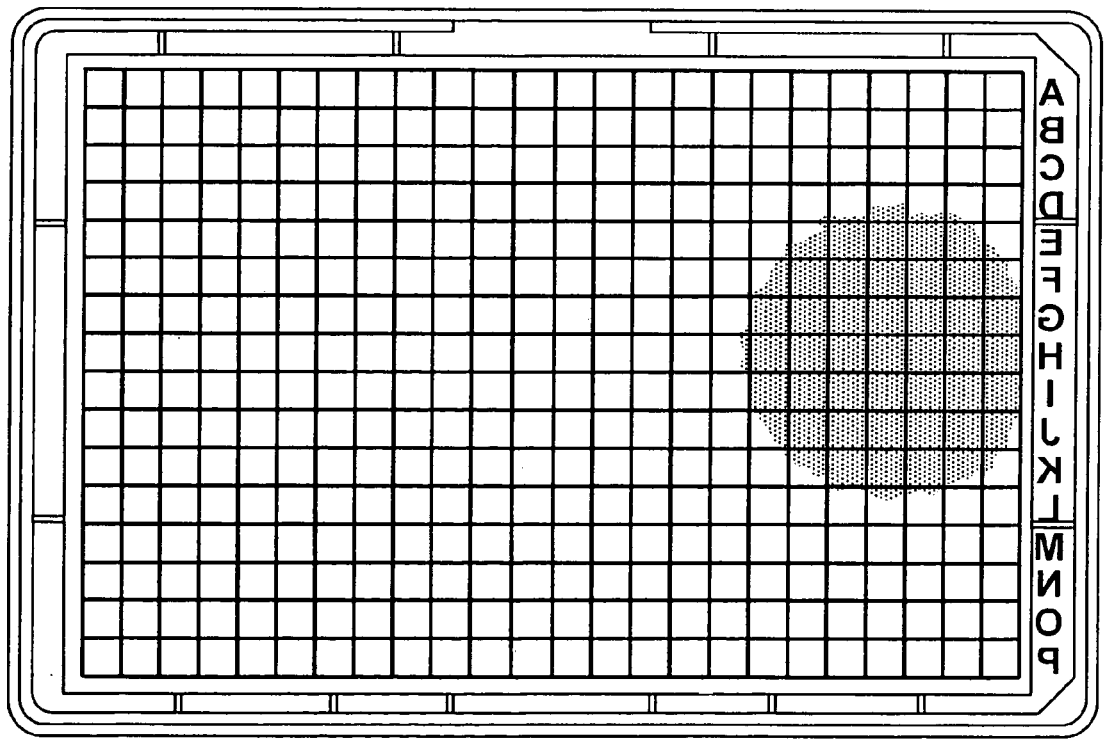
FIG. 3B shows a planar view of a bottom surface of a comparative plate as described in Example 2.

Any remaining liquid was then removed by pipette from the well and the plate was turned over and the bottom surface was observed and photographed. FIG. 3A shows plate A according to the present invention. FIG. 3B shows plate B.

As can be clearly seen from FIGS. 3A and B, the plate according to the invention (FIG. 3B) is only stained in the area of the one well that contained the solution. The well of B allowed fluid to spread laterally through the filter to adjoining wells (53 wells at least partially colored).

EXAMPLE 3

Figure 5:
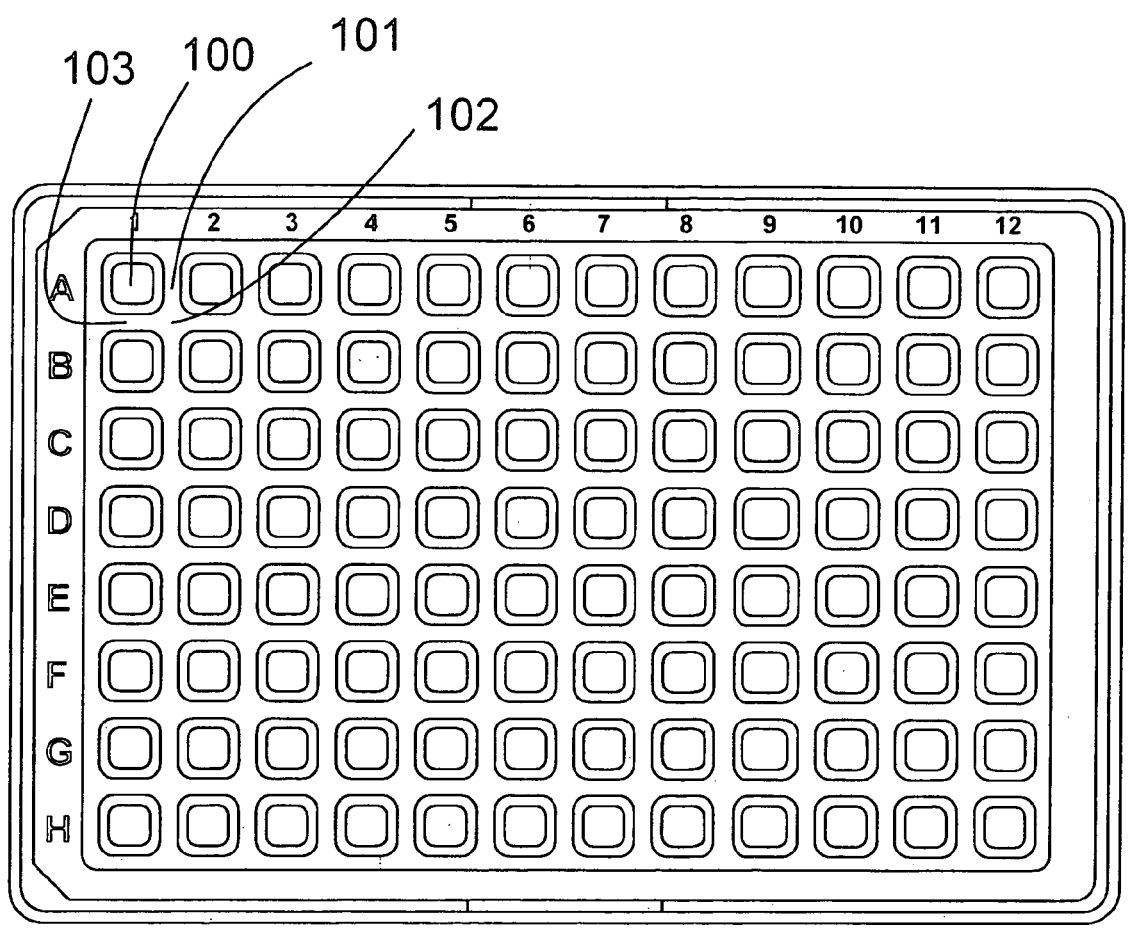
FIG. 5 shows a top down planar view of a 345 well, 96 active well plate design mentioned in Example 3.

Two 345 well plates, each containing 96 active wells, Multiscreen® polystyrene plates, available from Millipore Corporation of Bedford, Mass., were obtained. FIG. 5 shows such an arrangement of the plate. In this design, only one well, 100, of the four adjacent wells 101, 102, 103, is active, the others being covered by plastic to render them unusable. Each plate was sealed with a HVPP filter available from Millipore Corporation of Bedford, Mass. by a gluing procedure using 3201 light curable adhesive from Loctite Corporation. The glue was applied to the ribs of the bottom surface of the plates and then the membrane was applied over it. Hand pressure was applied to obtain a good seal and the glue was cured with UV light.

One plate A was then heat sealed by a flat heater of a size and shape to fit the bottom surface of the plate in two separate heat seal steps at 375° F. for 4 seconds at 70 psi with the plate being turned 180° between seals around the periphery of each well. The other plate B was left as is.

100 µl of a 0.1% (w/v) Ponceau S in 5% (w/v) acetic acid, (Sigma Catalog # P7170) was added to one well of each plate. The liquid was allowed to stand at room temperature for fifteen minutes.

Figure 4A:
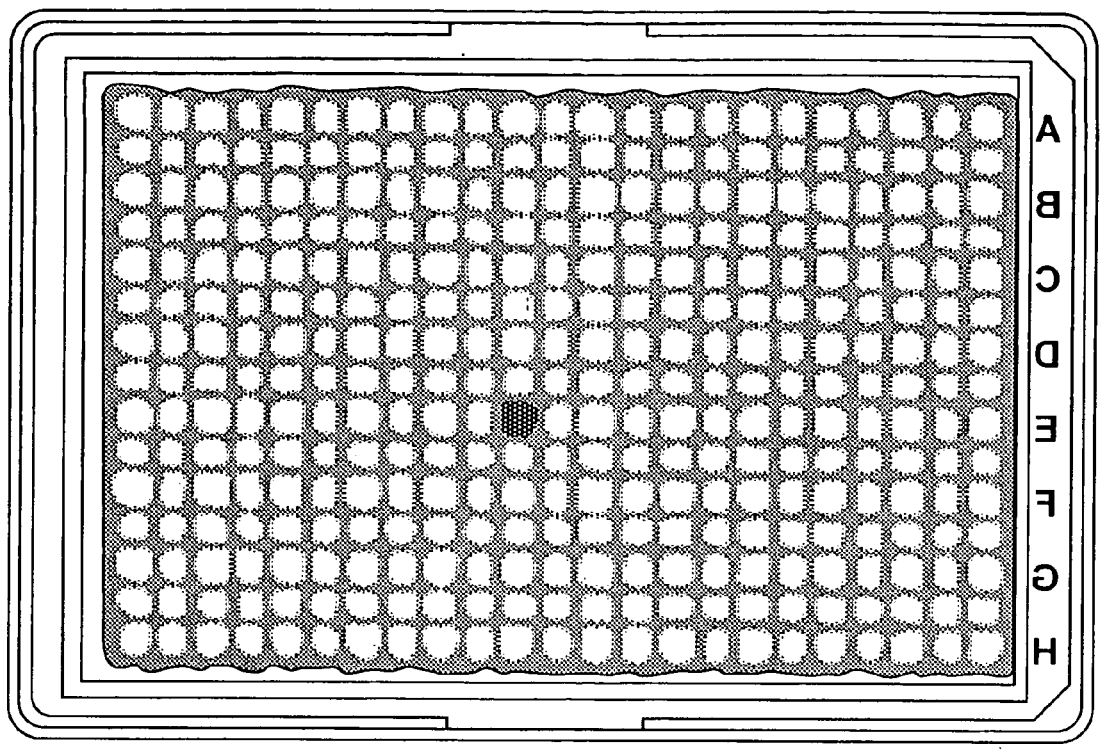
FIG. 4A shows a planar view of a bottom surface of the present invention as described in Example 3.
Figure 4B:
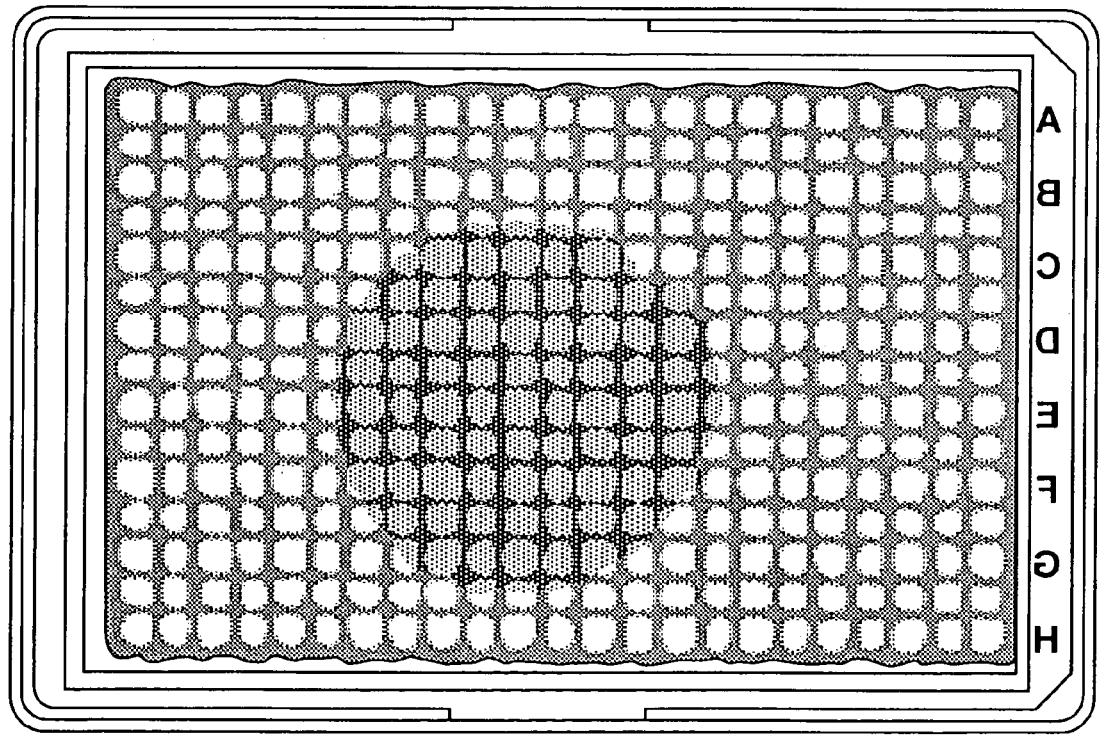
FIG. 4B shows a planar view of a bottom surface of a comparative plate as described in Example 3.

Any remaining liquid was then removed by pipette from the well and the plate was turned over and the bottom surface was observed and photographed. FIG. 4A shows plate A according to the present invention. FIG. 4B shows plate B.

As can be clearly seen from FIGS. 4A and B, the plate according to the invention (FIG. 4A) is only stained in the one well that contained the solution. The well of 4B allowed fluid to spread laterally through the filter to 87 (fully or at least partially) adjoining wells.

The invention claimed is:

1. A method of forming a multiwell filtration plate comprising the steps of:
   a) providing a multiwell plate containing a series of wells formed through the thickness of the plate, the plate having a top and a bottom surface and the wells having an open top corresponding with the top surface of the plate and an open bottom corresponding with the bottom surface of the plate;
   b) applying glue to the bottom surface of the plate surrounding each well;
   c) providing a filter sheet of a size equal to or greater than that of the bottom surface of the plate and applying the filter sheet to the bottom of the plate;
   d) allowing the glue to penetrate the filter material;
   e) allowing the glue to cure; and
   f) then heat bonding the filter material overlaying the bottom surface of the plate surrounding the wells.

2. The process of claim 1 wherein the heat bonding is applied by a heated template corresponding in size and shape to the bottom surface of the plate surrounding the wells, such that the heat bonding is formed in area beyond an outer periphery of each well.

3. The process of claim 1 further comprising (g) attaching an underdrain to the bottom of the plate over the glued and heat sealed filter material.

4. A method of forming a multiwell filtration plate comprising the steps of:
   a) providing a multiwell plate containing a series of wells formed through the thickness of the plate, the plate having a top and a bottom surface and the wells having an open top corresponding with the top surface of the plate and an open bottom corresponding with the bottom surface of the plate;
   b) applying glue to the bottom surface of the plate surrounding each well;
   c) providing a filter sheet of a size equal to or greater than that of the bottom surface of the plate and applying the filter sheet to the bottom of the plate;
   d) allowing the glue to penetrate the filter material;
   e) curing the glue; and
   f) then heat bonding the filter material overlaying the bottom surface of the plate surrounding the wells so as to render the heat treated areas substantially non-porous.

5. The method of claim 4 wherein the heat bonding is by a heated platen corresponding in size and shape to the bottom surface of the plate surrounding the wells, such that the heat bonding is formed in area beyond an outer periphery of each well.

6. The method of claim 4 wherein the heat treated areas are non-porous.

7. A method of forming a multiwell filtration plate comprising the steps of:
   a. providing a multiwell plate containing a series of wells formed through the thickness of the plate, the plate having a top and a bottom surface and the wells having an open top corresponding with the top surface of the plate and an open bottom corresponding with the bottom surface of the plate;
   b) applying glue selected from the group consisting of light curing adhesives, cyanoacrylate adhesives and thermally activated adhesives to the bottom surface of the plate surrounding each well;
   c) providing a filter sheet of a size equal to or greater than that of the bottom surface of the plate and applying the filter sheet to the bottom of the plate;
   d) allowing the glue to penetrate the filter material surrounding each well;
   e) allowing the glue to cure; and f) then heat bonding the filter material overlaying the bottom surface of the plate surrounding the wells so as to render the heat treated areas non-porous.

8. A method of forming a multiwell filtration plate comprising the steps of:
   a. providing a multiwell plate containing a series of wells formed through the thickness of the plate, the plate having a top and a bottom surface and the wells having an open top corresponding with the top surface of the plate and an open bottom corresponding with the bottom surface of the plate;
   b) applying glue to the bottom surface of the plate surrounding each well;
   c) providing a filter sheet of a size equal to or greater than that of the bottom surface of the plate and applying the filter sheet to the bottom of the plate;
   d) allowing the glue to penetrate the filter material;
   e) allowing the glue to cure; and
   f) then heat bonding the filter material overlaying the bottom surface of the plate surrounding the wells, wherein the heat bonding step of (f) is made by two sequential heating steps.

9. A method of forming a multiwell filtration plate comprising the steps of:
   a) providing a multiwell plate containing a series of wells formed through the thickness of the plate, the plate having a top and a bottom surface and the wells having an open top corresponding with the top surface of the plate and an open bottom corresponding with the bottom surface of the plate;
   b) applying glue to the bottom surface of the plate surrounding each well;
   c) providing a filter sheet of a size equal to or greater than that of the bottom surface of the plate and applying the filter sheet to the bottom of the plate;
   d) allowing the glue to penetrate the filter material;
   e) allowing the glue to cure; and
   f) then heat bonding the filter material overlaying the bottom surface of the plate surrounding the wells, wherein the heat bonding step of (f) is made by two sequential heating steps with the multiwell plate being rotated 180 degrees between the sequential heating steps.

10. A method of forming a multiwell filtration plate comprising the steps of:
    a) providing a multiwell plate containing a series of wells formed through the thickness of the plate, the plate having a top and a bottom surface and the wells having an open top corresponding with the top surface of the plate and an open bottom corresponding with the bottom surface of the plate;
    b) applying glue to the bottom surface of the plate surrounding each well;
    c) providing a filter sheet of a size equal to or greater than that of the bottom surface of the plate and applying the filter sheet to the bottom of the plate;
    d) allowing the glue to penetrate the filter material;
    e) allowing the glue to cure; and
    f) then heat bonding the filter material overlaying the bottom surface of the plate surrounding the wells so as to render the heat treated areas substantially non-porous, wherein the heat bonding step of (f) is made by two sequential heating steps.

11. A method of forming a multiwell filtration plate comprising the steps of:
    a. providing a multiwell plate containing a series of wells formed through the thickness of the plate, the plate having a top and a bottom surface and the wells having an open top corresponding with the top surface of the plate and an open bottom corresponding with the bottom surface of the plate;
    b. applying glue to the bottom surface of the plate surrounding each well;
    c. providing a filter sheet of a size equal to or greater than that of the bottom surface of the plate and applying the filter sheet to the bottom of the plate;
    d. allowing the glue to penetrate the filter material;
    e. allowing the glue to cure; and
    f. then heat bonding the filter material overlaying the bottom surface of the plate surrounding the wells so as to render the heat treated areas substantially non-porous wherein the heat bonding step of (f) is made by two sequential heating steps with the multiwell plate being rotated 180 degrees between the sequential heating steps.

12. A method of forming a multiwell filtration plate comprising the steps of:
    a) providing a multiwell plate containing a series of wells formed through the thickness of the plate, the plate having a top and a bottom surface and the wells having an open top corresponding with the top surface of the plate and an open bottom corresponding with the bottom surface of the plate;
    b) applying glue selected from the group consisting of light curing adhesives, cyanoacrylate adhesives and thermally activated adhesives to the bottom surface of the plate surrounding each well;
    c) providing a filter sheet of a size equal to or greater than that of the bottom surface of the plate and applying the filter sheet to the bottom of the plate;
    d) allowing the glue to penetrate the filter material surrounding each well;
    e) allowing the glue to cure; and
    f) then heat bonding the filter material overlaying the bottom surface of the plate surrounding the wells so as to render the heat treated areas non-porous, wherein the heat bonding step of (f) is made by two sequential heating steps.

13. A method of forming a multiwell filtration plate comprising the steps of:
    a) providing a multiwell plate containing a series of wells formed through the thickness of the plate, the plate having a top and a bottom surface and the wells having an open top corresponding with the top surface of the plate and an open bottom corresponding with the bottom surface of the plate;
    b) applying glue selected from the group consisting of light curing adhesives, cyanoacrylate adhesives and thermally activated adhesives to the bottom surface of the plate surrounding each well;
    c) providing a filter sheet of a size equal to or greater than that of the bottom surface of the plate and applying the filter sheet to the bottom of the plate;
    d) allowing the glue to penetrate the filter material surrounding each well;
    e) allowing the glue to cure; and
    f) then heat bonding the filter material overlaying the bottom surface of the plate surrounding the wells so as to render the heat treated areas non-porous, wherein the heat bonding step of (f) is made by two sequential heating steps with the multiwell plate being rotated 180 degrees between the sequential heating steps.

* * * * *